No. 872,378. PATENTED DEC. 3, 1907.
A. J. SCHAAF.
HIGH PRESSURE STEAM GENERATOR.
APPLICATION FILED NOV. 21, 1906.

2 SHEETS—SHEET 1.

WITNESSES:
Jesse C. Miller

INVENTOR
Adolph J. Schaaf
By N. C. Everett Co.
Attorneys

No. 872,378. PATENTED DEC. 3, 1907.
A. J. SCHAAF.
HIGH PRESSURE STEAM GENERATOR.
APPLICATION FILED NOV. 21, 1906.

2 SHEETS—SHEET 2.

WITNESSES:
Jesse C. Miller.

INVENTOR
Adolph J. Schaaf.
BY H. C. Everitt Co.
Attorneys

UNITED STATES PATENT OFFICE.

ADOLPH J. SCHAAF, OF PITTSBURG, PENNSYLVANIA.

HIGH-PRESSURE STEAM-GENERATOR.

No. 872,378.  Specification of Letters Patent.  Patented Dec. 3, 1907.

Application filed November 21, 1906. Serial No. 344,383.

*To all whom it may concern:*

Be it known that I, ADOLPH J. SCHAAF, a citizen of the United States of America, residing at Pittsburg, in the county of Allegheny and State of Pennsylvania, have invented certain new and useful Improvements in High-Pressure Steam-Generators, of which the following is a specification, reference being had therein to the accompanying drawing.

This invention relates to high pressure steam generators, especially adapted for use with marine engines, but also capable of use with stationary engines.

The primary object of the invention is to provide a generator of the class indicated, of novel and effective construction, in which the usual boiler tubes are omitted and a battery of externally heated cylinders or drums employed and so connected and relatively arranged as to insure a thorough and equal heating of all the drums.

A further object of the invention is to provide an improved generator having a mud drum so connected and associated with the several cylinders or drums as to insure the collection of the sediment and foreign matter precipitated therefrom.

The construction of the improved apparatus will be fully described hereinafter in connection with the accompanying drawings, which form a part of this application, and its novel features will be defined in the appended claims.

Figure 1:
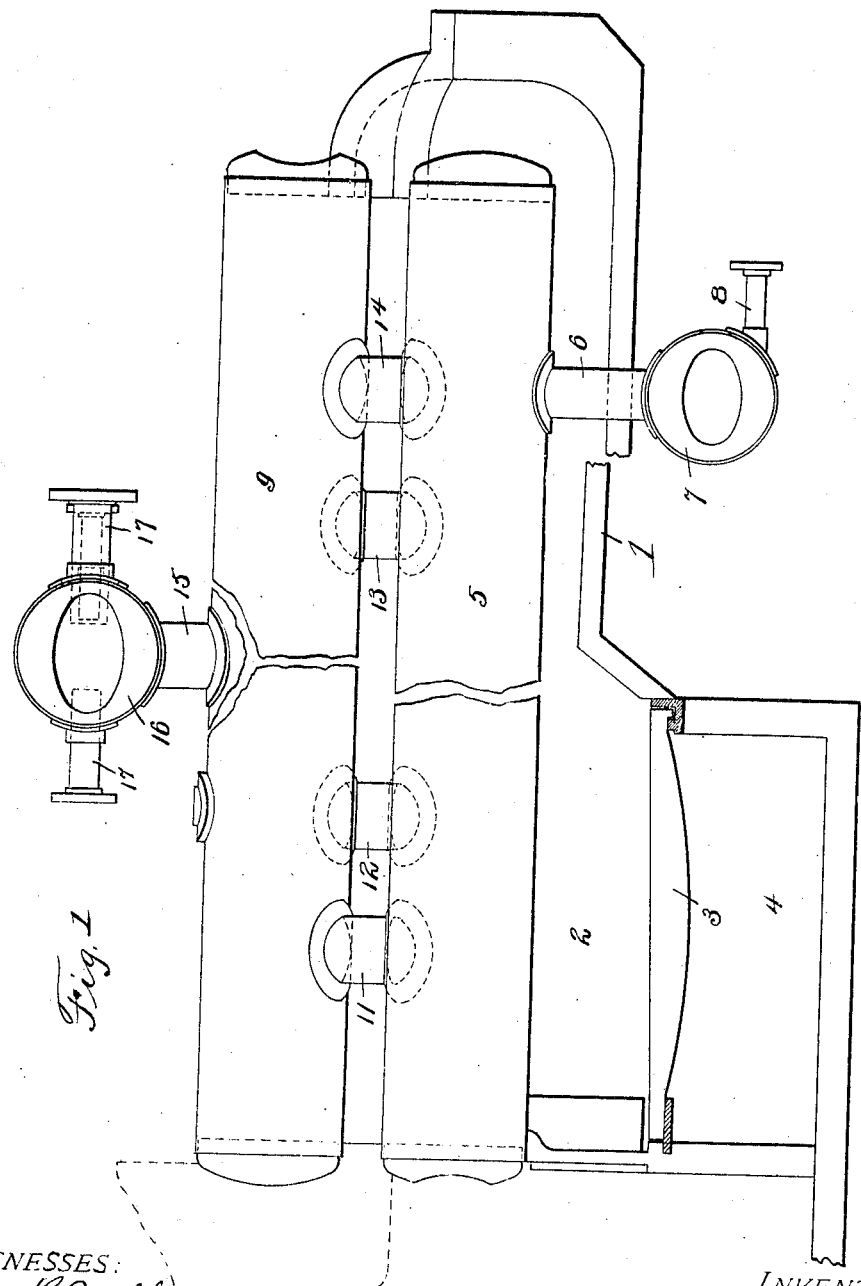
Figure 2:
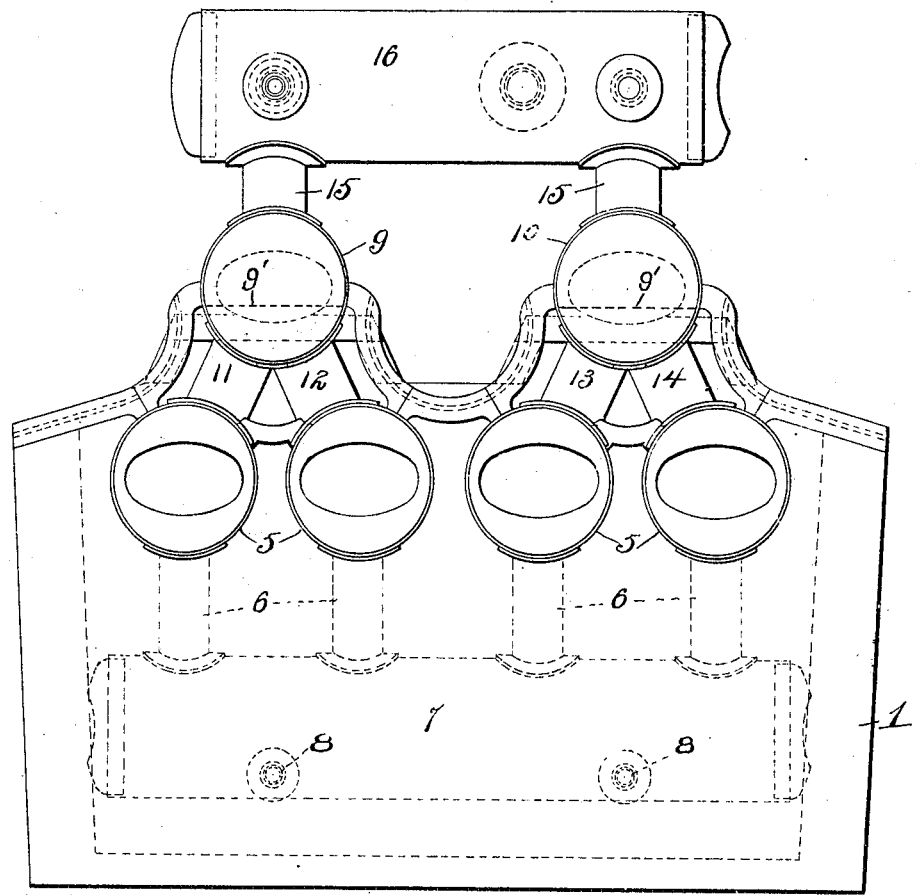

In the drawing, Figure 1 is a side elevation partly in section and partly broken away, or fore-shortened of the improved generator boiler embodying the invention. Fig. 2 is a transverse section on the line $y$—$y$ of Fig. 1.

The reference numeral 1 designates the supporting shell or casing of the generator and 2 the fire-box thereof having the usual grate bars as shown at 3, and an ash-pit 4.

A plurality of longitudinally-disposed drums or cylinders 5 are arranged in parallel relation above the fire box 2, and depending from the under side of each of said cylinders near the front end thereof is a pipe 6, said pipes communicating with a drum or cylinder 7 extending transversely of the series of drums or cylinders 5 and serving as a mud drum for the reception of sediment. This drum 7 is provided with suitable discharge pipes 8. I have shown a battery of four of the cylinders 5, and above the same are two supplemental drums or cylinders 9 and 10 extending longitudinally of the generator and between the cylinders 5, or out of vertical alinement therewith. The cylinder 9 is connected with the two adjacent cylinders 5 by oppositely inclined pipes 11 and 12, and the cylinder 10 is connected with the other two cylinders 5 by oppositely inclined pipes 13 and 14, as many of the pipes 11, 12, 13 and 14 being employed as are required, but for the purpose of illustration, two of the pipes are shown for each pair of drums, and disposed relatively near the ends of the same, and also disposed out of transverse alinement, as shown in Fig. 1.

Rising centrally from each of the upper supplemental cylinders 9 and 10 is a pipe 15 connecting said cylinders to an upper transversely disposed cylinder 16 serving as the steam dome or drum and provided with oppositely projecting supply pipe connections 17.

The cylinders 5, 9 and 10 are supplied with water up to the water line in the cylinders 9 and 10 indicated by dotted lines 9' in Fig. 2, the water rising through the pipes 11, 12, 13 and 14 from the cylinders 5, to the upper cylinders 9 and 10. The cylinders are heated by the products of combustion circulating around them as indicated by the arrows in Fig. 1 and the steam generated rises through the pipes 15 to the steam dome or cylinder 16, from whence it is conducted by suitable pipes to the engine.

Disposed between the drums 5 are deflecting plates 18, 19, and 20. Between the outer drum 5 on one side and the upper drum 9 is a deflecting plate 21, and between the outer drum 5 on the opposite side and the upper drum 10 is another deflecting plate 22, and between the outer drum 5 on one side and the side wall 1 is a deflecting wall 23, and between the outer drum 5 on the opposite side and the opposite side wall 1 is another deflecting plate 24. Between the inner side of the upper drum and the adjacent edge of the plate 20 is a deflecting plate 25, and between the inner side of the upper drum 10 and the adjacent edge of the central plate 20 is another deflecting plate 26. By this arrangement the course of the products of combustion are controlled and caused to travel first longitudinally of the drums 5 from front to rear, and thence respectively between the upper drums 9 and 10 and the lower drums 5 from rear to front. The deflecting plates 23, 24 form closures between the side walls 1 and the outer lower drums 5, while the central plate 20 forms a closure between the inner drums 5, while the plate 18 forms a closure or bridge between one pair of the drums 5 at one side, and the plate 19 forms a bridge between the pair of drums 5 at the opposite side. The plates 21, 25, form arching closures respectively between one pair of the drums 5 and the upper drum 9, while the plates 22, 26, form arching closures between the other pair of lower drums 5 and the upper drum 10. At the rear the wall 1 is provided with a smoke arch 27, which conducts the products of combustion into the spaces between the drums 9 and 5, and 10 and 5 respectively, while a smoke hood indicated at 28 in Fig. 1, conveys the products of combustion in the usual manner to the stack. The location of the mud-drum with relation to the lower drums 5 directs the sediment to the drum through the pipes 6. It will be understood that the ends of the several cylinders are all provided with suitable manholes, as shown in the various views. The manholes of the upper drums 9, 10, are accessible from the front, and outside of the walls 1 and "front" of the generator, and of the smoke arch 27, as shown, while the manholes of the steam drum 16 and the mud drum 7 are accessible from the ends, as shown.

What I claim and desire to secure by Letters Patent, is:—

A steam generator comprising a battery of lower parallel drums spaced apart and arranged in pairs, a supplemental upper drum arranged above each pair of said lower drums and spaced therefrom, pipes between said lower drums and upper drums, vertical rear and side walls spaced from said lower drums, a combustion chamber within said walls, longitudinal bridge plates between said lower drums, longitudinal bridge plates between said side walls and said lower drums, longitudinal bridge plates between each of said upper drums and its respective pair of lower drums, a smoke arch at the rear ends of the drums, and a smoke hood at the forward ends of the drums.

In testimony whereof I affix my signature in the presence of two witnesses.

ADOLPH J. SCHAAF.

Witnesses:
MAX H. SROLOVITZ,
F. O. McCLEARY.